US008229976B2

United States Patent
Burns

(10) Patent No.: US 8,229,976 B2
(45) Date of Patent: Jul. 24, 2012

(54) DATA BINDING FOR XML SCHEMAS

(75) Inventor: Steven P Burns, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 631 days.

(21) Appl. No.: 12/057,325

(22) Filed: Mar. 27, 2008

(65) Prior Publication Data

US 2009/0248730 A1    Oct. 1, 2009

(51) Int. Cl.
*G06F 7/00* (2006.01)
*G06F 17/30* (2006.01)
*G06F 3/00* (2006.01)

(52) U.S. Cl. ......... 707/805; 707/790; 707/811; 715/700

(58) Field of Classification Search ........................ None
See application file for complete search history.

(56) References Cited

U.S. PATENT DOCUMENTS

| | | | |
|---|---|---|---|
| 6,594,823 B1 | 7/2003 | Corbin et al. | |
| 6,760,721 B1 * | 7/2004 | Chasen et al. | 1/1 |
| 7,155,705 B1 | 12/2006 | Hershberg et al. | |
| 2002/0091835 A1 * | 7/2002 | Lentini et al. | 709/227 |
| 2002/0107973 A1 * | 8/2002 | Lennon et al. | 709/231 |
| 2003/0135825 A1 | 7/2003 | Gertner et al. | |
| 2003/0163603 A1 | 8/2003 | Fry et al. | |
| 2005/0057560 A1 | 3/2005 | Bibr et al. | |
| 2005/0071354 A1 * | 3/2005 | Cameron et al. | 707/100 |
| 2005/0154978 A1 | 7/2005 | Albornoz et al. | |
| 2006/0089941 A1 | 4/2006 | Jenni et al. | |
| 2006/0123039 A1 | 6/2006 | Scheuerle et al. | |
| 2006/0195454 A1 | 8/2006 | Davis et al. | |
| 2007/0106933 A1 * | 5/2007 | Nene et al. | 715/513 |
| 2007/0130205 A1 | 6/2007 | Dengler et al. | |
| 2007/0260575 A1 * | 11/2007 | Robinson et al. | 707/1 |

OTHER PUBLICATIONS

Payrits, et al., "Metadata-Based XML Serialization for Embedded C++", 2006, IEEE International Conference on Web Services (ICWS'06), IEEE Computer Society, IEEE, 2006, pp. 8.
Kolpackov, et al., "An Introduction to XML Data Binding in C++", May 4, 2007, Artima, Inc., 1996-2007, pp. 1-12.

* cited by examiner

*Primary Examiner* — Susan Chen
(74) *Attorney, Agent, or Firm* — Russell S. Krajec; Krajec Patent Offices, LLC

(57) ABSTRACT

A user interface may be generated from an XML schema. For a data object definition in an XML schema, a user interface object may be defined, and a memory store for the data object may be created and bound to the user interface object. The user interface component may be defined in the XML schema, as a separate file, or within an XML document. A user interface object may be selected based on the data type, and various limits and display mechanisms and input devices may be configured based on the schema. When bound, the data stored in the memory store may be reflected in the user interface component, and changes to the user interface component may be reflected in the memory store.

20 Claims, 3 Drawing Sheets

DATA BINDING FOR XML SCHEMAS

BACKGROUND

XML is a declarative mechanism for defining data, and XML schema is a declarative mechanism for defining a type of XML document, typically expressed in terms of constraints on the structure and content of documents of that type, above and beyond the basic syntax constraints imposed by XML itself. An XML schema provides a view of the document type at a relatively high level of abstraction.

There are languages developed specifically to express XML schemas. The Document Type Definition (DTD) language, which is native to the XML specification, is a schema language that is of relatively limited capability, but that also has other uses in XML aside from the expression of schemas. Two other very popular, more expressive XML schema languages are XML Schema (W3C) and RELAX NG.

The mechanism for associating an XML document with a schema may vary according to the schema language. The association may be achieved via markup within the XML document itself, or via some external means.

The process of checking to see if an XML document conforms to a schema is called validation, which is separate from XML's core concept of syntactic well-formedness. All XML documents are well-formed, but a document may be valid when an XML parser may check the document for conformance with the document's schema. Documents are considered valid if they conform to the schema with which they have been associated.

SUMMARY

A user interface may be generated from an XML schema. For a data object definition in an XML schema, a user interface object may be defined, and a memory store for the data object may be created and bound to the user interface object. The user interface component may be defined in the XML schema, as a separate file, or within an XML document. A user interface object may be selected based on the data type, and various limits and display mechanisms and input devices may be configured based on the schema. When bound, the data stored in the memory store may be reflected in the user interface component, and changes to the user interface component may be reflected in the memory store. In some embodiments, the XML schema or other definition may include groupings of user interface components, layout definitions, and define other user interface layout, function, and look and feel.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
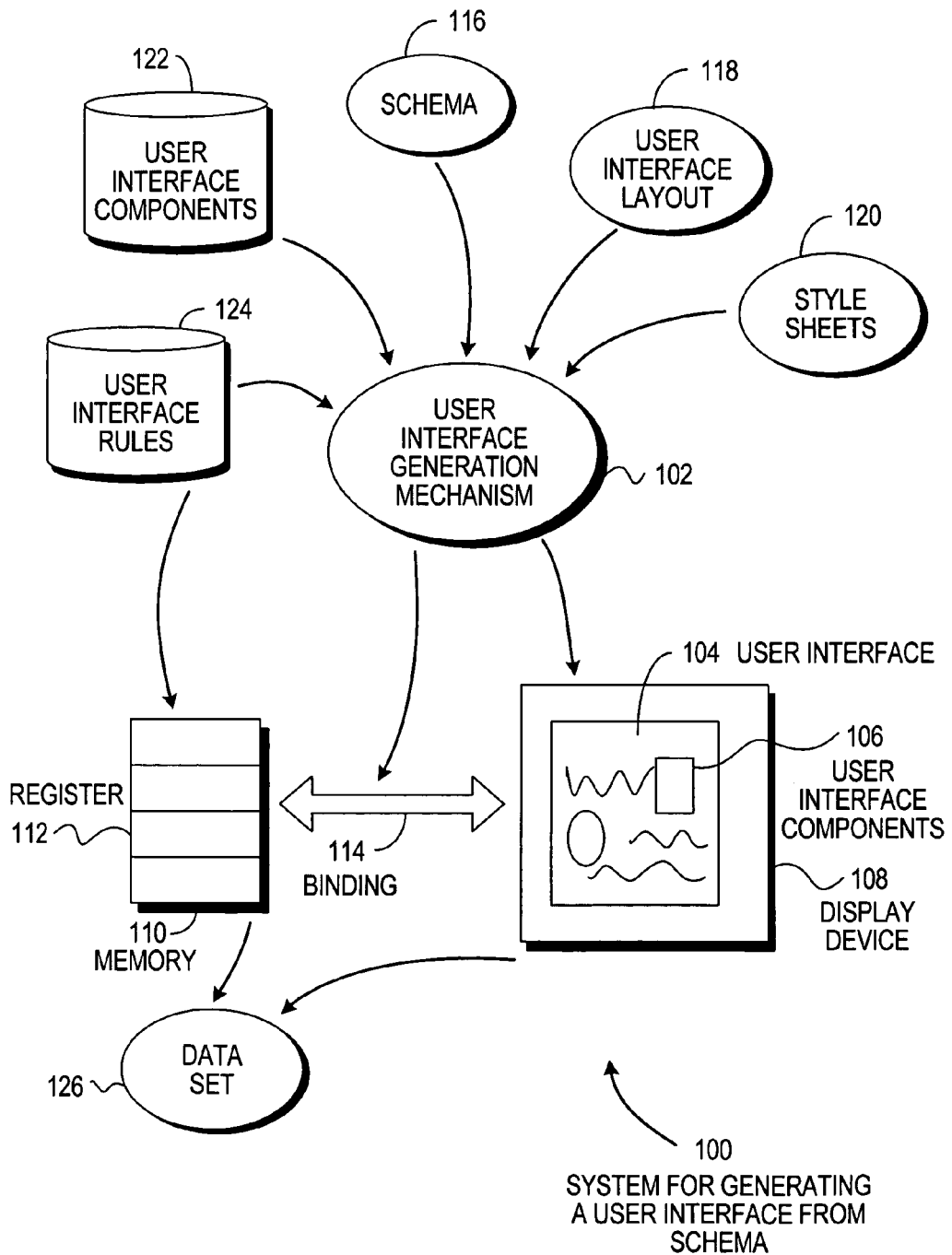
FIG. 1 is a diagram illustration of an embodiment showing a system for generating a user interface from schema.

A user interface may be generated, formatted, arranged, and presented in large part from a schema. The various components in the user interface may be bound to memory locations created along with the user interface. The schema or another formatting definition may be used to control the look and feel, placement, organization, and type of user interface components that may be presented to a user.

The schema may be an XML schema or other schema of any type. Schemas may be defined in XML using the W3C XML Schema, RELAX NG, DTD, or any other schema language. Many such languages may be extended to include various parameters that may be used to generate user interface components.

A user interface component may be any user interface device that is used to display an attribute, data content, or variable. In many cases, a user interface component may have both input and output mechanisms. An output mechanism may display a value or content of a memory location. An input mechanism may enable a user to change the value or interact with the memory location directly or indirectly.

An example of a user interface component may be a slider bar. A range of numbers may be graphically illustrated by a bar and a pointer may be positioned on the bar to represent the current value of a numerical variable. A user may be able to interact with the slider to move the pointer to a different location and thus change the value of the numerical variable.

In many embodiments, a schema may define various complex data structures. For example, several data elements may be arranged in a group that has a specific order. When generating user interface components to represent the data elements, the schema may be used to define visual or graphical groupings of the user interface components in accordance with the schema.

Some embodiments may use a secondary source for generating a user interface. For example, the basic layout of a user interface may be defined using HTML or other markup language, and style sheets or other mechanisms may be used to control portions of the look and feel of the user interface.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system capable to generating a user interface from a schema. Embodiment 100 is an example of a system that may analyze a schema to find a data object, determine various characteristics of the data object, and select a user interface component to represent the object. A user interface may be created and bindings established to a memory location using the schema.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 may use any type of schema to automatically generate a user interface that may represent the schema. Embodiment 100 may be used to select and configure individual elements of a user interface or to create an entire user interface.

A schema is a definition of the structure, content, and, to some extent, the semantics of a dataset. A schema may represent relationships between elements of the dataset, as well as describe the format and limits of data elements. Some schemas enable data to be expressed in many manners, including complex expressions that may use elements to define other elements or parameters associated with an element.

Many schema languages exist. For example, XML data may be described using Document Type Definition language. Other schema languages include XML Schema (W3C), REgular LAnguage for XML Next Generation (RELAX NG), and other schema languages exist. Schemas may exist for data structures other than XML as well.

In this specification, XML Schema (W3C) may be used as an example of various data structures that may be analyzed. However, such examples are merely illustrative and similar concepts may be found in other schema applications.

The schema may include parameters that may be used by a user interface generation mechanism 102 to configure a user interface 104 and to select and configure various user interface components 106. The user interface 104 may be displayed on a display device 108.

The user interface 104 may be a graphical user interface. In many embodiments, the user interface 104 may be contained in a graphical window or other type of user interface. In many embodiments, a user interface 104 may be constructed as an interactive interface, with graphical output and a user input.

The user input may be received by any mechanism by which a user may interact with the user interface 104. Examples of input mechanisms may include a mouse, tablet, touchscreen, stylus, trackball, keyboard, knob box, or any other input mechanism.

When a user interface component is selected and configured, the user interface component may display contents of a memory location 110 using the user interface component. In some cases, the user may be able to change the contents of a register 112 within the memory location by interacting with or changing the user interface component. For example, a dial indicator may graphically display a value stored in a memory register 112. A user may be able to click on the dial and change the position of the dial. Such a change may be updated in the register 112.

Such interaction between a memory location and the user interface component may be created by a binding 114.

Binding is the process of representing a memory object as another object. In this case, a memory object may be bound to a user interface component. The user interface component may display a representation of the memory location, and changes to the user interface component may be reflected in the memory location.

The memory locations and registers 112 may be created based on the schema 116. The schema 116 may contain various parameters that describe a dataset, including the type, format, and various limitations of the data. The schema 116 may describe the data in many different formats with different levels of complexity, and from such a description, a memory location may be created and bound to a user interface component.

The user interface mechanism 102 may use several sources of information and data to create the user interface 104 and, in some cases, memory objects and binding to those memory objects. The user interface mechanism 102 may use a schema 116, a user interface layout 118, and style sheets 120 or other definitions to create the user interface. In some cases, a database of user interface components 122 and various user interface rules 124 may be used to select an appropriate user interface component.

In some embodiments, the schema 116 may contain all of the information that may be used to generate the user interface 104. In a typical case, the user interface generation mechanism 102 may contain logic or processes that may be used to determine an appropriate user interface component and position and format the user interface 104.

In other embodiments, a user interface layout 118 may be provided that contains HTML or other definition of a user interface 104. In some cases, the user interface layout 118 may be a template or other definition that may describe the positioning, sizing, and other layout information. In some embodiments, some or all of such information may be contained in the schema 116.

Some embodiments may use style sheets 120 or other shared layout definitions. Style sheets 120 may contain definitions for the layout and format of various components of a user interface, such as text size, text font, and text formatting, as well as describe styles that may be applied to different components such as titles, normal text, captions, or other components.

Figure 2:
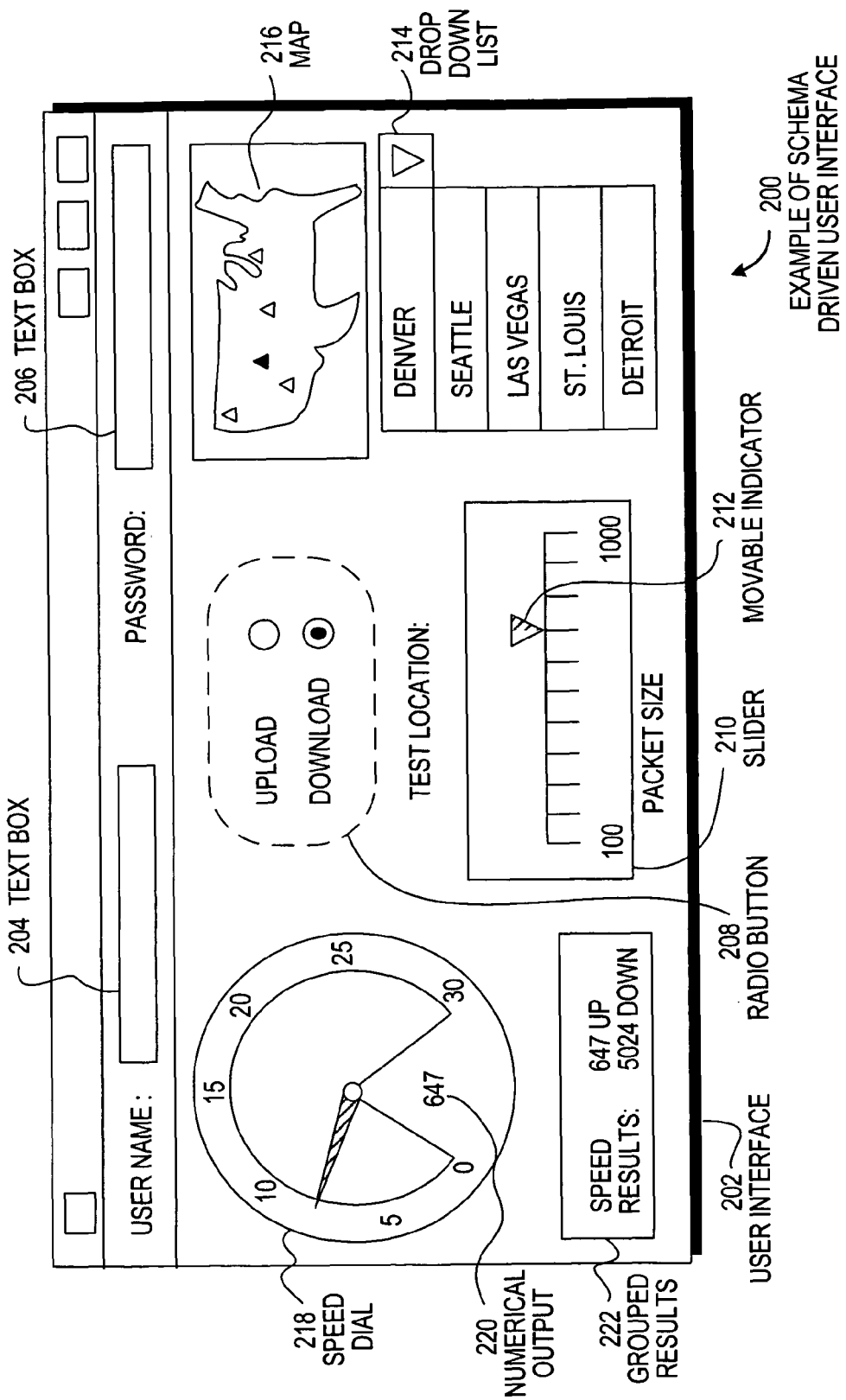
FIG. 2 is a diagram illustration of an example embodiment showing a user interface that may be created using a schema.

A database of user interface components 122 may contain many different types of user interface components that may be used in different situations. A user interface component may be any mechanism by which a data element may be displayed. Several examples of user interface components are illustrated in FIG. 2 of this specification.

A user interface component may be defined as a portion of a graphical user interface that may be modified for various situations. For example, a user interface component for a text object may be a text input box. The text input box may have a default set of configuration parameters, such as number of characters, font size, font color, label, label position, or other parameters. Using the schema 116, the user interface layout 118, and/or style sheets 120, the text input box may be adjusted and configured. For example, the style sheets 120 may be used to define the font size and color, the user interface layout 118 may define the width and height of the text box, and the schema 116 may define the label and any default value for the text box.

The database of user interface components 122 may have a wide range of user interface components. The user interface rules 124 may provide various logic, algorithms, or rules for determining an appropriate user interface component for a particular application.

The user interface 104 may be displayed and a user may interact with the user interface 104 to input and manipulate data. From the user interface 104 and the memory 110, a data set 126 may be derived. The portions of the data set 126 that come from the user interface 104 may be comply with the schema 116, as those portions may be defined through limitations and formatting of the user interface 104 which were, in turn, defined by the schema 116.

The data set 126 may be used for various applications, including interfacing with web services, transferring to a database, or any other use for data. In many cases, the data set 126 may be XML or a similar declarative language. In such cases, the schema 116 may be an XML schema. When a user interface is generated using the schema 116, the dataset 126 may conform to the types, format limitations, and restrictions of the schema. In other words, the dataset 126 may be valid with respect to the schema 116.

FIG. 2 is a diagram illustration of an embodiment 200 showing an example of a user interface 202 that may be created using a schema. In the discussion of embodiment 200, example schema may be shown to illustrate various concepts. The examples are not meant to represent any specific schema language, but only to illustrate concepts described. Other schema may use different languages, formats, descriptors, or mechanisms for describing a data structure and creating a user interface from the structure.

The user interface 202 is an example user interface of a network speed test application. The user interface 202 may be generated from a schema. In some embodiments, one or more user interface components may be automatically selected and configured by analyzing the schema, selecting a user interface component, and configuring the component and user interface.

As one example the text boxes 204 and 206 may be created in response to a pair of related text data elements. An example of a schema that may be used to create the text boxes is illustrated in Table 1.

TABLE 1

```
<xs:element name="userauthentication">
    <xs:complexType>
        <xs:sequence>
            <xs:element name="username" type="xs:string"/>
            <xs:element name="password" type="xs:string"/>
        </xs:sequence>
    </xs:complexType>
</xs:element>
```

In table 1, two string elements, "username" and "password" are defined. The element "userauthentication" includes both "username" and "password" and defines the order of the elements.

When a user interface generation mechanism analyzes the schema of Table 1, the elements "username" and "password" may be identified as text or string variables, causing two text boxes to be used as user interface components. Each text box may have a label associated with it, and the label may be the element name.

Because "username" and "password" are defined in a group, the two user interface devices may be located next to or near each other. Further, since the two elements are defined in sequence, "username" may be located on the left and "password" may be located on the right.

The example of the text boxes 204 and 206 is an example of how user interface components may be selected, grouped using relationships from the schema definition, and displayed. When the text boxes 204 and 206 are active on the user interface 202, a user may enter text into each of the boxes in order to authenticate the user to the system.

Another example of a user interface component is a radio button 208. The radio button 208 may be created with a Boolean data type. In some embodiments, a radio button user interface component may be the default component for a Boolean data type. In other embodiments, the radio button user interface component may be specifically defined in the schema or in an accompanying layout definition, style sheet, or other auxiliary definition used to create the user interface 202.

The radio button 208 may have labels defined in which the values of "UPLOAD" and "DOWNLOAD" are defined. In some embodiments, a specific type of radio button user interface component may be defined, such as a stacked version illustrated, where two values placed in a vertical arrangement with respect to each other.

In some cases, the layout and configuration of the parts of the radio button 208 may be positioned at the time the entire user interface 202 is laid out. In such a case, a radio button 208 user interface component may be selected and labels applied, but the actual positioning and arrangement of the radio button components may be finalized during the configuration of the overall user interface 204 which may be done after all the user interface components are defined.

The slider 210 is an example of a user interface component that may be used for displaying and modifying a numerical value. An example of a schema definition of the slider 210 is illustrated in Table 2.

TABLE 2

```
<xs:element name="packetsize">
  <xs:simpleType>
    <xs:restriction base="xs:integer">
      <xs:minInclusive value="100"/>
      <xs:maxInclusive value="1000"/>
    </xs:restriction>
  </xs:simpleType>
</xs:element>
```

The slider 210 may operate by displaying an acceptable range of values and positioning a movable indicator 212 above the current value. In order to change the value of the underlying data, a user may click and drag or otherwise move the position of the movable indicator 212.

In Table 2, the element name is "packetsize". The element name may be displayed with the slider 210. The element "packetsize" is restricted to be an integer number between 100 and 1000, inclusive based on the schema.

After analyzing the schema, a user interface generation mechanism may select a slider user interface component, attach the limits to the component, and configure the label as "PACKET SIZE". Such a definition may be used to create a visual or graphic depiction of the slider 210 and may be used to capture changes made by a user.

A drop down list 214 may be used to display and select from a discrete group of options for a variable. Table 3 illustrates an example of a schema definition that may be used to create some or all of the drop down list.

TABLE 3

```
<xs:element name="Test Location">
  <xs:simpleType>
    <xs:restriction base="xs:string">
      <xs:enumeration value="Denver"/>
      <xs:enumeration value="Seattle"/>
      <xs:enumeration value="Las Vegas"/>
      <xs:enumeration value="St. Louis"/>
      <xs:enumeration value="Detroit"/>
    </xs:restriction>
  </xs:simpleType>
</xs:element>
```

The drop down list 214 may be a user interface component that may display a set of options when activated. The user may be able to scroll over and select one of the options, which may then be used to define the value of the underlying variable.

The drop down list 214 may be created and populated by the schema of Table 3. In the schema of Table 3, the element name is "Test Location" and may be used as the label for the user interface control. The string element "Test Location" is restricted to having only 5 choices, "Denver", "Seattle", "Las Vegas", "St. Louis", and "Detroit". The various choices may be attached to the user interface control when the control is created and displayed.

When a user interface generation mechanism examines a data structure such as defined in Table 3, the mechanism may select a drop down list from several other user interface components. A set of rules or other logic may be used to recognize the data structure of Table 3 and determine that a drop down list is an appropriate user interface control for the particular data structure.

Various other user interface controls may be derived from the schema or from some other definition. The map 216 may be used to highlight which of the locations in the drop down list 214 is selected. The map 216 may be selected as a user interface component using the same schema of Table 3. The map 216 may be an interactive user interface component that may display the current location and may have hot spots or other interactive elements defined for the other location options.

In embodiment 200, the drop down list 214 and interactive map 216 may be created from the same schema. In such a case, the presence and position of the related user interface components may be defined within the schema itself, or within a separate layout definition.

Examples of other user interface components are a speed dial 218 that may include a numerical output 220 as well as some grouped results 222. In some embodiments, the user interface components may be output only components, and may not have a mechanism for receiving input. In such a case, a binding operation between the user interface component and a memory location may enable the user interface component to display the current value of the memory location. A program or other mechanism may update the memory location and have the display update using the binding attribute.

In some embodiments, each time a user interface component is created from a schema, a memory location may be created or identified for storing a related value. A binding may be created so that updates to the user interface component will be reflected in the memory location, and vice versa.

The schema may be used to create a user interface component with certain limitations or capabilities as defined by the schema. Data that may be collected and stored in the memory locations through the binding mechanism may inherently conform to the schema and, as such, a validation of the resulting data may not be performed to ensure valid data.

Figure 3:
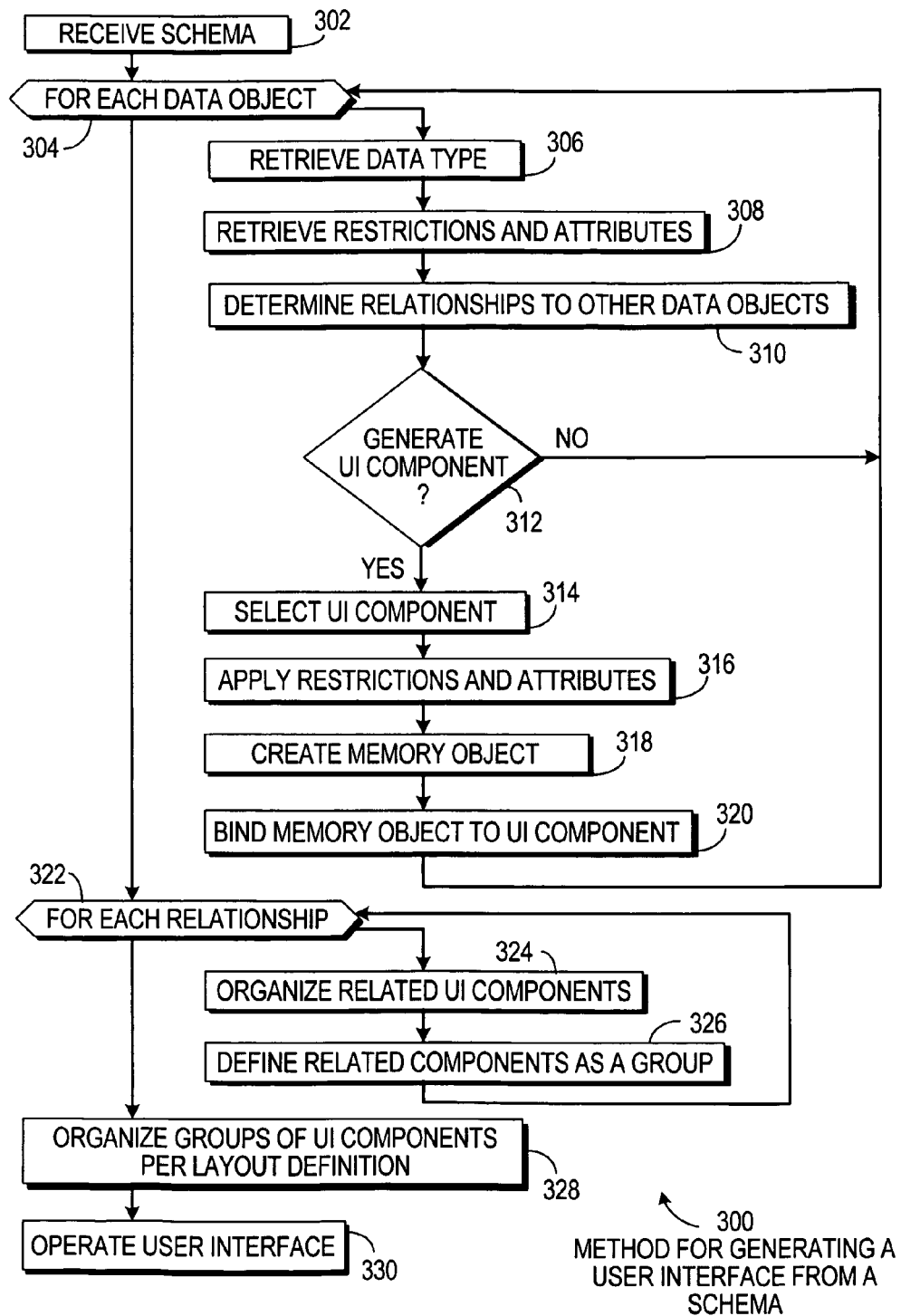
FIG. 3 is a flowchart illustration of an embodiment showing a method for generating a user interface from a schema.

FIG. 3 is a flowchart illustration of an embodiment 300 showing a method for analyzing a schema and creating a user interface from the schema. For each data object in the schema that is displayed in the user interface, a memory location is created and bound to the user interface component. The user interface may be operated and may display and update the contents of the memory location.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 is an example of a method that analyzes each data object within a schema and configures a user interface component for each object. The user interface component may be bound to a corresponding memory object.

During the analysis of embodiment 300, relationships between data objects may be tracked. Based on the relationships, user interface components that are related may be grouped together prior to laying out the user interface. After the groups are defined, the user interface components, along with any other feature or aspect of a user interface, are laid out and organized into a user interface.

The embodiment 300 may be a mechanism for generating a user interface or a portion of a user interface 'on the fly' or on demand. In some cases, a portion of a user interface may be pre-defined, but another portion may be created based on the schema using embodiment 300.

When a user interface is created on request, a programmer may be relieved of the duties of creating and maintaining separate user interfaces for various situations and conditions. Also, user interfaces may be created for many different applications with a minimum of design or programming. Often, a template or style sheet may be defined that may be used across many different user interfaces. A template or style sheet may define the general placement of objects within a user interface along with colors, fonts, and other 'look and feel' characteristics.

In some embodiments, the embodiment 300 may be used by a programmer to define a user interface. The embodiment 300 may be used to automatically generate code that may be later modified or stored for later reuse. The code may be incorporated into an application and used as a user interface that is hard-coded or predefined.

The schema may be received in block 302. In some embodiments, the schema may be a schema for an XML data structure. In other embodiments, the schema may define any type of data structure with any type of schema language or definition mechanism.

For each data object in the schema in block 304, the data type may be retrieved in block 306 and any restrictions or attributes may be retrieved in block 308. In many schemas, a single data object may be defined in several different manners. The format of data may be defined by a data type and various attributes. The content of the data may be restricted to certain limits, such as bounds on the data or a variable that may have only a discrete set of values.

In many cases, a data object may be defined in relationship to another data object. Some data objects may be grouped, sequenced, or otherwise organized. Some data objects may be used to define other data objects and may have inherency, dependence, or other types of relationships. The relationships may be analyzed so that user interface components based on those data objects may be visually or programmatically organized together.

Many schemas may allow complex data types that may include multiple data objects organized together or multiple data objects having different types. Such data types may define various types of relationships that may exist between data objects.

A decision point in block 312 determines if a user interface component is to be generated for the data object. If not, the process returns to block 304. If a user interface component is to be generated, the user interface component is selected in block 314.

A user interface component may enable the data values associated with the data object to be displayed and, in some cases, modified by a user. There may be some instances where a user interface component may receive data but not display data. An example of such a user interface component may be a password input device where the password contents are not meaningfully displayed.

In some cases, a data object may be dependent or derived from another data object. In such a case, the dependent data object may or may not have a separate user interface component created. In other cases, an attribute or modifier for the data object in the schema may indicate that the data object is or is not to be assigned a user interface component.

Some embodiments may have a separate user interface layout that may serve as a user interface definition. Such a layout may define which data objects are to have user interface components and which are not. In some embodiments, a lengthy schema with many data objects may be analyzed to generate user interface components for one, two, or some other subset of data objects. Various mechanisms may be used to identify those data objects.

A user interface component may be selected in block 314. The particular user interface selected in block 314 may be defined in many different manners. In some embodiments, a set of user interface rules, logic, or an algorithm may recognize a data structure and select a user interface component that is assigned to the data structure. For example, a simple text element may be assigned a text input box. In another example, an integer that is bounded by an upper and lower limit may be assigned a slider user interface component. There may be many different user interface components each useful for one or more types and configuration of data objects.

In some embodiments, the user interface component may be defined in the schema, in a user interface layout definition, or through some other source. In such cases, the schema or other source of a definition may be select a specific user interface component for a specific data object.

In some cases, two or more user interface components may be used for a single data object. In the example of embodiment 200, the interactive map 216 and drop down list 214 may both be used as separate user interfaces to the data structure of Table 3.

Some user interface components may have various options that may be configured or set. In block 316, such options, restrictions, and attributes may be configured for the user interface component. In some cases, such options may be defined in a style sheet, user interface layout, or other definition. In some cases, various options, limitations, and restrictions may be gathered from the schema, where specific limitations or restrictions may be defined for the underlying data. In some instances, such limitations and restrictions may be applied to the user interface component in a visual manner, such as with a limit on a slider bar, for example, or such limitations may be applied in a non-visual manner. A non-visual manner may be a setting or filter that may ensure a data value conforms with the schema without generating a visual depiction of such limitation, restriction, or attribute.

A memory object may be created in block 318 and a binding established in block 320 between the memory object and a portion of the user interface component. In many cases, a binding may enable the user interface component to display the contents of the memory object and, when the user interface component is updated, the memory object will also be updated.

For each relationship in block 322, the related user interface components may be organized in block 324 and defined as a group in block 326. The relationships between various data objects may be used to visually group the user interface devices together, such as placing the user interface devices in proximity, bounding the devices with a box, organizing the devices in sequence, or other organization.

After the related user interface components are organized together, the groups of user interface components may be laid out and organized with other independent user interface components and other elements per a layout definition in block 328. The user interface may be operated in block 330, displaying data contained in the memory objects and accepting user actions through the user interface to update the memory locations.

Because the user interface components may be defined using a schema, and the user interface components may include various limitations, types, restrictions, formats, and other definitions from the schema, data that may be collected and displayed using the user interface components may be valid according to the schema.

The embodiment 300 illustrates one method for creating a user interface made up of several user interface components. In some cases, two or more components may be related to each other. The related components may be used to create a group, and the group may be laid out and positioned with respect to other user interface components. Other embodiments may use different techniques and methods for producing a user interface using various user interface components defined in a schema.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
   receiving an XML schema comprising a first data object definition, said first data object definition describing data to be displayed;
   selecting a first graphical user interface component based first data object definition, said first graphical user interface component comprising an output mechanism and an input mechanism;
   configuring said first graphical user interface component based on said first data object definition;
   creating a first memory store based on said first data object definition;
   binding at least a portion of said first graphical user interface component to said first memory store;
   generating a user interface comprising said first graphical user interface component which includes at least a speed-dial ring, an interactive geographical map and a geographical drop-down list to facilitate corresponding uploading or downloading of data packets; and
   operating said user interface.

2. The method of claim 1, said first data object definition comprising at least one restriction, said method further comprising:
   configuring said first graphical user interface component based on said at least one restriction.

3. The method of claim 1 further comprising:
   receiving a user interface descriptor; and
   using said user interface descriptor to generate at least a portion of said user interface.

4. The method of claim 3, said user interface descriptor comprising HTML.

5. The method of claim 1, said first data object definition comprising a complex element.

6. The method of claim 1, said first data object definition being comprised in a first group definition with a second data object definition, said method further comprising:
   selecting a second graphical user interface component, wherein said user interface further comprises said second graphical user interface component.

7. The method of claim 6, said first group definition being used to visually group said first graphical user interface component and said graphical second user interface component within said user interface.

8. The method of claim 1, said first data object definition comprising at least one indicator, said method comprising:
   configuring said first graphical user interface component based on said at least one indicator.

9. The method of claim 1, said schema comprising at least one configuration parameter for said first graphical user interface component.

10. The method of claim 9, said first graphical user interface component being identified in said schema.

11. A system comprising:
    a plurality of graphical user interface components;
    a display device;
    a memory device;
    a user interface generation mechanism configured to:
       receive an XML schema comprising a first data object definition;
       select a first graphical user interface component based on said first data object definition, said first graphical user interface component comprising an output mechanism and an input mechanism;
       configure said first graphical user interface component based on said first data object definition;
       create a first memory store in said memory device based on said first data object definition;
       bind at least a portion of said first graphical user interface component to said first memory store;
       generate a user interface display comprising said first user graphical interface component which includes at least a speed-dial ring, an interactive geographical map and a dropdown list to facilitate corresponding uploading or downloading of data packets; and
       display said user interface display on said display device.

12. The system of claim 11 further comprising:
    a database comprising said plurality of graphical user interface components.

13. The system of claim 12 further comprising:
    a set of selection rules configured to select one of said plurality of graphical user interface components from said database based on said XML schema.

14. The system of claim 11, said first graphical user interface component being at least partially defined in said XML schema.

15. The system of claim 14, said first graphical user interface component having layout information concerning being at least partially defined in said XML schema.

16. The system of claim 11, said first graphical user interface component being configured in conjunction with a style sheet.

17. The system of claim 11, said user interface generation mechanism further configured to:
    receive a user interface layout definition; and
    configure said user interface in accordance with said user interface layout definition.

18. The system of claim 17, said user interface layout definition comprising HTML.

19. A method comprising:
    receiving an XML schema comprising a first data object definition, said first data object definition comprising a restriction on data;
    selecting a first graphical user interface component based on said first data object definition, said first graphical user interface component comprising an output mechanism and an input mechanism;
    configuring said first graphical user interface component based on said first data object definition and said restriction;

creating a first memory store based on said first data object definition;

binding at least a portion of said first graphical user interface component to said first memory store;

generating a user interface comprising said graphical user interface component which includes at least a speed-dial ring, an interactive geographical map and a dropdown list to facilitate corresponding uploading or downloading of data packets; and operating said user interface such that said memory store contains data in conformance with said restriction.

20. The method of claim 19, said first data object definition being a data definition for a plurality of data elements, said plurality of data elements comprising a structure, said method further comprising:

organizing said first graphical user interface component based on said structure.

* * * * *